United States Patent
Hecker et al.

(10) Patent No.: US 12,214,444 B2
(45) Date of Patent: Feb. 4, 2025

(54) METHODS AND DEVICES FOR MONITORING A WELDING PROCESS FOR WELDING GLASS WORKPIECES

(71) Applicant: TRUMPF Laser-und Systemtechnik GmbH, Ditzingen (DE)

(72) Inventors: Sebastian Hecker, Aichhalden (DE); Tim Hesse, Ditzingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 726 days.

(21) Appl. No.: 17/318,263

(22) Filed: May 12, 2021

(65) Prior Publication Data

US 2021/0260700 A1    Aug. 26, 2021

Related U.S. Application Data

(63) Continuation of application No. PCT/EP2019/081049, filed on Nov. 12, 2019.

(30) Foreign Application Priority Data

Nov. 13, 2018 (DE) .......................... 102018128368.7

(51) Int. Cl.
*B23K 26/324* (2014.01)
*B23K 26/03* (2006.01)
(Continued)

(52) U.S. Cl.
CPC .......... *B23K 26/324* (2013.01); *B23K 26/032* (2013.01); *B23K 26/0624* (2015.10);
(Continued)

(58) Field of Classification Search
CPC ...... B23K 26/324; B23K 26/032; G06T 7/70; G06T 7/73
See application file for complete search history.

(56) References Cited

U.S. PATENT DOCUMENTS 5,272,312 A   12/1993  Jurca
6,060,685 A   5/2000   Chou et al.
(Continued)

FOREIGN PATENT DOCUMENTS

CN    2740335 Y    11/2005
CN    201015816 Y  2/2008
(Continued)

OTHER PUBLICATIONS

Yong-Woo, The detection of the internal defect in the glass using auto focusing method. Dec. 31, 2004, The Korean Society of Mechanical Engineers, vol. 28 issue 7, pp. 1047-1054 (Year: 2004).*

(Continued)

*Primary Examiner* — Nathaniel E Wiehe
*Assistant Examiner* — Spencer H. Kirkwood
(74) *Attorney, Agent, or Firm* — Fish & Richardson P.C.

(57) ABSTRACT

The present disclosure relates to methods and devices for monitoring a welding process for welding at least one glass workpiece to another workpiece, the workpieces being welded together in a process zone that is exposed to a processing beam, e.g., to a laser beam, such as an ultrashort-pulse laser beam, wherein radiation emitted by the process zone and originating from at least one of the workpieces is detected in a spatially resolved manner.

13 Claims, 2 Drawing Sheets

(51) Int. Cl.
| | |
|---|---|
| *B23K 26/0622* | (2014.01) |
| *B23K 26/244* | (2014.01) |
| *B23K 26/26* | (2014.01) |
| *B23K 26/57* | (2014.01) |
| *B23K 31/12* | (2006.01) |
| *B23K 101/18* | (2006.01) |
| *B23K 103/00* | (2006.01) |
| *C03B 23/203* | (2006.01) |
| *G06T 7/00* | (2017.01) |
| *G06T 7/73* | (2017.01) |

(52) U.S. Cl.
CPC ............ *B23K 26/244* (2015.10); *B23K 26/26* (2013.01); *B23K 26/57* (2015.10); *B23K 31/125* (2013.01); *C03B 23/203* (2013.01); *G06T 7/001* (2013.01); *G06T 7/73* (2017.01); *B23K 26/03* (2013.01); *B23K 2101/18* (2018.08); *B23K 2103/54* (2018.08); *G06T 2207/30164* (2013.01)

(56) References Cited

U.S. PATENT DOCUMENTS

| | | |
|---|---|---|
| 6,326,589 B1 | 12/2001 | Beersiek et al. |
| 6,670,574 B1 | 12/2003 | Bates et al. |
| 7,343,218 B2 | 3/2008 | Caldwell et al. |
| 8,497,931 B2 | 7/2013 | Ohki |
| 8,563,893 B2 | 10/2013 | Kuno et al. |
| 8,890,023 B2 | 11/2014 | Dorsch et al. |
| 9,089,926 B2 | 7/2015 | Pfitzner et al. |
| 9,138,913 B2 | 9/2015 | Arai et al. |
| 9,501,821 B2 | 11/2016 | Pfitzner et al. |
| 9,776,280 B2 | 10/2017 | Ogura et al. |
| 10,632,570 B2 | 4/2020 | Oowaki et al. |
| 10,702,948 B2 | 7/2020 | Ortner et al. |
| 11,229,973 B2 | 1/2022 | Haug et al. |
| 11,878,365 B2 | 1/2024 | Dicken et al. |
| 2002/0158053 A1 | 10/2002 | Kessler et al. |
| 2004/0200067 A1 | 10/2004 | Ogura et al. |
| 2006/0278113 A1 | 12/2006 | Kawagoe et al. |
| 2009/0206065 A1 | 8/2009 | Kruth et al. |
| 2010/0025387 A1* | 2/2010 | Arai ............... B29C 65/1654 219/121.73 |
| 2011/0139760 A1 | 6/2011 | Shah et al. |
| 2012/0285936 A1 | 11/2012 | Urashima et al. |
| 2013/0344302 A1 | 12/2013 | Helie |
| 2014/0175071 A1 | 6/2014 | Pfitzner et al. |
| 2014/0231021 A1 | 8/2014 | Liu et al. |
| 2015/0027168 A1 | 1/2015 | Dabich et al. |
| 2015/0075700 A1 | 3/2015 | Kawagishi et al. |
| 2017/0095885 A1* | 4/2017 | Zhang ............... B23K 26/21 |
| 2019/0022793 A1 | 1/2019 | Haug et al. |
| 2021/0260698 A1 | 8/2021 | Hecker et al. |

FOREIGN PATENT DOCUMENTS

| | | | |
|---|---|---|---|
| CN | 101553339 A | 10/2009 | |
| CN | 101965242 A | 2/2011 | |
| CN | 103100792 A | 5/2013 | |
| CN | 103857490 A | 6/2014 | |
| CN | 204277222 U | 4/2015 | |
| CN | 204621355 U | 9/2015 | |
| DE | 10222786 A1 * | 11/2003 | ............. B23K 26/04 |
| DE | 102004036576 A1 | 3/2006 | |
| EP | 0911109 | 9/2003 | |
| EP | 2543464 A2 | 1/2013 | |
| EP | 2915785 | 9/2015 | |
| JP | 2010279994 | 12/2010 | |
| JP | 2016097412 A | 5/2016 | |
| KR | 2012 0039212 | 4/2012 | |
| WO | WO 2008/052591 | 5/2008 | |
| WO | WO 2013/000622 | 1/2013 | |
| WO | WO 2017/157856 | 9/2017 | |
| WO | WO 2020/099420 | 5/2020 | |
| WO | WO 2020/099421 | 5/2020 | |

OTHER PUBLICATIONS

Alexander Horn, Dynamical detection of the optical phase changes during micro-welding of glass with ultra-short laser radiation, Dec. 17, 2007, Measurement Science and Technology, vol. 19, No. 1, p. 4. (Year: 2007).*
US Final Office Action in United States U.S. Appl. No. 17/318,598, mailed on Sep. 13, 2023, 26 pages.
KR Office Action in Korean Appln. No. 10-2021-7018103, dated Nov. 24, 2022, 9 pages (with English translation).
DE Office Action in German Appln. No. 102018128377.6, mailed on Jun. 16, 2023, 12 pages (with English translation).
CN Office Action in Chinese Appln. No. 201980074783.9, mailed on Aug. 3, 2022, 14 pages (with English translation).
CN Office Action in Chinese Appln. No. 201980074783.9, mailed on Jul. 22, 2023, 15 pages (with English translation).
Cvecek et al., "Gas bubble formation in fused silica generated by ultra-short laser pulses," Optics Express, Jun. 2014, 22(13):15877-93.
US Non-Final Office Action in United States U.S. Appl. No. 17/318,598, mailed on Mar. 13, 2024, 27 pages.
US Non-Final Office Action in United States U.S. Appl. No. 17/318,598, dated May 11, 2023, 39 pages.
KR Office Action in Korean Appln. No. 10-2021-7018103, dated May 24, 2023, 11 pages (with English translation).
EP Office Action in European Appln. No. 19808961.7, mailed on Nov. 3, 2023, 12 pages (with English translation).
EP Office action in European Appln. No. 19808962.5, mailed on Nov. 6, 2023, 12 pages (with English translation).
Hecker, "Process monitoring during glass welding, invention submission," Ediologic Portal, submitted Mar. 2, 2018, 12 pages (with English translation).
CN Office Action in Chinese Appln. No. 201980074783.9, mailed on Mar. 22, 2023, 7 pages (with English translation).
CN Office Action in Chinese Appln. No. 201980074784.3, dated Aug. 1, 2022, 16 pages (with English translation).
Beersiek, "A CMOS camera as a tool for process analysis not only for laser beam welding," from URL <http://www.lessmueller.de/en/visualization>, Jul. 30, 2015, 1 page.
Cvecek et al., "Analysis of shockwave formation in glass welding by ultra-short pulses," Procedia CIRP, Jan. 1, 2018, 74:339-43.
Cvecek et al., "Defect formation in glass welding by means of ultra-short laser pulses," Physics Procedia, Jan. 1, 2010, 5:495-502.
Muller, "Process monitoring in laser beam welding by evaluating the Reflected power," University of Stuttgart, 2002, 254 (with English translation).
PCT International Search Report and Written Opinion in International Appln. No. PCT/EP2019/081051, dated Mar. 24, 2020, 10 pages (with English translation).
PCT International Search Report and Written Opinion in International Appln. No. PCT/EP2019/081049, dated Mar. 25, 2020, 10 pages (with English translation).
Richter, "Direct laser bonding of transparent Materials using ultra-short laser pulses at high repetition rates," Friedrich-Schiller-Universität Jena, Dissertation, Mar. 6, 2014.
CN Office Action in Chinese Appln. No. 201980074783.9, dated Aug. 12, 2022, 12 pages (with English translation).
CN Office Action in Chinese Appln. No. 201980074783.9, mailed on Sep. 27, 2024, 8 pages (English translation).

* cited by examiner

METHODS AND DEVICES FOR MONITORING A WELDING PROCESS FOR WELDING GLASS WORKPIECES

CROSS REFERENCE TO RELATED APPLICATIONS

This application is a continuation of and claims priority under 35 U.S.C. § 120 from PCT Application No. PCT/EP2019/081049, filed on Nov. 12, 2019, which claims priority from German Application No. 10 2018 128 368.7, filed on Nov. 13, 2018. The entire contents of each of these priority applications are incorporated herein by reference.

TECHNICAL FIELD

The present disclosure relates to methods and devices for monitoring a welding process for welding at least one glass workpiece to a further workpiece, e.g., also made of glass, wherein the monitoring may serve, for example, for detecting and identifying cracks and/or imperfections and/or defects in glass workpieces during laser welding.

BACKGROUND

In laser welding of glass workpieces, the laser welding process has been set up manually to date. Quality control of the workpieces welded together by the laser welding process and of the weld seam itself has also been carried out manually to date.

In this regard, the quality control was performed by means of a microscope through microscopic examinations of the weld seams and of the other regions of the joined workpieces after completion of the actual welding process, both in top view and by inspection of transverse sections.

On this basis, the laser welding process was then optimized iteratively. This approach for optimizing the welding process requires a correspondingly high amount of manual work and is material- and time-intensive, since quality control for the respective parameter set of the laser welding process can only be performed on the microscope after completion of the respective welding process and outside the welding device.

In laser welding of metals, it is known to monitor the radiation emitted from the respective process zone, into which the focus of the laser is placed, with an image sensor and to derive insights about the welding process therefrom.

Such a method for laser welding of opaque materials is known, for example, from WO 2008/052591A1. In this method, the radiation emitted from a working region is sensed by a detector system, wherein the radiation emitted from the working region is sensed simultaneously at least two wavelengths so as to obtain more detailed information of the processes occurring in the welding process.

SUMMARY

The present disclosure provides methods and devices for monitoring a welding process for welding at least one glass workpiece to a further workpiece, e.g., also made of glass, which allow for improved monitoring of the welding process.

In one aspect, the disclosure provides methods for monitoring a welding process for welding at least one glass workpiece to a further workpiece, for example, also made of glass, wherein the workpieces are welded together in a process zone that is exposed to a processing beam, e.g., to a laser beam, such as an ultra-short-pulse laser beam. According to the disclosure, radiation emitted by the process zone and originating from at least one of the workpieces is detected in a spatially resolved manner.

In certain embodiments, both, multiple, or all workpieces that are to be welded together are made of glass. The process zone, in which the weld seam is formed, can be located between the workpieces, such that the processing beam is guided to the process zone through at least one workpiece, which is transparent to the processing beam. Accordingly, at least the workpiece through which the processing beam is guided to the process zone is transparent to the processing beam. The further workpieces may also be transparent; however, may also be opaque to the processing beam.

By detecting the radiation originate from at least one of the workpieces in a spatially resolved manner, it becomes possible to perform monitoring of the welding process, already during the welding process while welding glass workpieces, such that the presence and/or the formation and/or the change of cracks and/or imperfections and/or defects in at least one of the workpieces, e.g., in a workpiece made of glass, may be detected.

Based on these insights, among other things, the welding process can be optimized already during the execution of the current welding process, thereby avoiding the need for an iterative process.

In this regard, the radiation emitted by the process zone and originating from at least one of the workpieces is detected in a spatially resolved manner. The process zone, in this regard, virtually serves as a radiation source arranged in the glass volume of one, two, multiple or all glass workpieces, which serves to irradiate and/or illuminate the glass volume formed by the glass workpieces. Thus, starting out from this radiation source formed by the process zone, it results that radiation is emitted within the workpiece and/or within the workpieces, said radiation then being reflected and/or scattered at cracks and/or imperfections and/or defects that are possibly already present, and/or occur in, and/or are changing in the glass volume formed by the at least one workpiece and may then be accordingly detected in a spatially resolved manner as the radiation originating from the workpiece.

In other words, radiation reflected and/or scattered at cracks and/or imperfections and/or defects is detected.

Hence, a radiation source within the workpiece is used to transilluminate the workpiece to detect defects in the workpiece.

By the spatially resolved detection of the radiation originating from the workpiece, a corresponding conclusion may be drawn regarding the presence and/or the occurrence and/or the change of cracks and/or defects and/or imperfections within the glass volume.

The process zone thus acts as a radiation source within the glass volume, such that the presence and/or the emergence and/or the change of cracks, and/or impurities, and/or defects within the glass volume may be detected already during the welding process by the radiation scattered and/or reflected thereon.

In this regard, the electromagnetic radiation emitted by the process zone can be radiation of the processing beam reflected and/or scattered at or in the process zone. The electromagnetic radiation emitted by the process zone can also be heat radiation of the glass material that is heated, e.g., melted, by the processing beam.

By the spatially resolved detection of the radiation originating from the workpiece, a localization of the cracks, and/or defects, and/or imperfections within the glass volume may be achieved at the same time.

Thus, the methods for monitoring a welding process for welding glass workpieces allows for a quality control already while the actual welding process is carried out and thus also for an optimization of the welding process by a subsequent and/or simultaneous evaluation of the radiation detected in a spatially resolved manner and originating from the workpiece.

The detection of the radiation originating from the workpiece can be performed in those regions of the at least one workpiece that are located outside the process zone. In this case, the process zone is accordingly considered exclusively as a radiation source, which applies radiation to regions outside the process zone within the glass volume formed by the workpieces.

In certain embodiments, the radiation originating from the workpiece is additionally also detected in a time-resolved manner. Hence, the new formation or the change of cracks and/or imperfections and/or defects can be monitored during the welding process. Hence, the changes in the glass volume caused by the welding process can be monitored. This information may be taken into consideration in a simultaneous or subsequent optimization step of the welding process so as to optimize the process parameters.

In some embodiment, the radiation originating from the workpiece is captured by an image sensor and is converted into a signal by the image sensor, wherein the signal is then prepared for a subsequent evaluation. Hence, an automated evaluation and also a subsequent automated optimization of the welding process can be achieved.

In this regard, the signal can be evaluated, for example, in terms of the presence, and/or the formation, and/or the change of cracks and/or imperfections and/or defects, wherein an error output can be provided when predefined tolerance limits are exceeded. Thus, an automated evaluation in terms of predefined errors in the at least one workpiece can be achieved to hence achieve a more reliably check of the work product and a quicker optimization of the welding process.

In this regard, the signal can be prepared by a filtering, and/or a noise reduction, and/or a smoothing, and/or a highlighting of special features, and/or a contrast enhancement and/or an edge filter.

The signal can be processed by an image processing system, wherein, for example, a synchronization of the determined signals and/or of the images represented by the signals is compared with a target distribution of intensity values outside the process zone and a determination of cracks and/or imperfections and/or defects may be achieved by an evaluation of the regions outside the process zone deviating from the target distribution in terms of the brightness and/or the contrast and/or the shape and/or the size of the deviating regions.

A further or alternative evaluation of the prepared signal can also be achieved by a spatial integration, for example, across the intensity values of the individual image pixels and a subsequent comparison with a previously determined tolerance range. Hence, a location information in the coordinate system of the workpieces may be determined in terms of the presence and/or the formation and/or the change of cracks and/or imperfections and/or defects.

In this regard, an uncertainty with respect to the determination of the location may result from deviations of the field of observation of the sensor used with the respective section of the workpieces, wherein this uncertainty may be reduced by an initial calibration of the sensor to the respectively viewed focal plane, and/or by the application of position and/or distance markings detectable by means of the sensor on at least one of the workpieces, or by a reference to the positioning of the process zone.

In a further embodiment, cracks, and/or imperfections, and/or defects are identified based on the radiation detected in a spatially resolved manner and originating from at least one of the workpieces and information regarding the identified cracks, and/or imperfections, and/or defects can be output.

In certain embodiments, a localization of cracks, and/or imperfections, and/or defects relative to the process zone is still output, wherein information on the localization of the cracks, and/or imperfections, and/or defects is output. Thus, a user can carry out a quality control and then decide, based on the output information, whether the work product meets the requirements.

Moreover, an evaluation of the found errors can also be carried out in an automated process and a work product can be automatically rejected if it does not meet predetermined quality requirements.

The methods serve for welding multiple glass workpieces. In some embodiments, all of the workpieces to be welded together are made of glass. However, glass workpieces can also be welded to workpieces that are opaque to the processing beam, for example, metallic workpieces.

In this regard, welding can be carried out at a border surface located between the workpieces, for example, the processing beam can be directed to penetrate at least one of the workpieces formed of glass before it meets the process zone at the border surface.

In another aspect, the present disclosure provides devices for monitoring a welding process for welding at least one glass workpiece to a further workpiece, e.g., also made of glass, wherein the devices include a processing objective for exposing a process zone of at least one of the workpieces to a processing beam, e.g., for exposing the process zone to a laser beam, such as an ultra-short-pulse laser beam. According to the disclosure, an image sensor is provided for a spatially resolved detection of radiation emitted by the process zone and originating from at least one of the workpieces.

Hence, the advantages of the methods already described above can be achieved by these new devices. In particular, the devices can be used to detect the presence, and/or the formation, and/or the change of cracks, and/or imperfections, and/or defects in the glass volume formed by the at least one workpiece.

In certain embodiments, an optic for capturing the radiation originating from the workpiece and for imaging the radiation onto the image sensor is provided, wherein the optic can be the processing objective or an objective separate from the processing objective.

Advantageously, an image sensor exposed with the processing objective may be provided, e.g., with the interposition of a beam splitter, and/or an optical filter, and/or a focusing lens, and an image sensor exposed with an objective separate from the processing objective may be provided. Thus, the region of the at least one workpiece imaged by the processing objective and the region of the workpiece imaged by the separate objective can be viewed.

In some embodiments, the processing objective is designed and configured for focusing the processing beam in a process zone located in the glass volume formed by the at least one workpiece.

An observation of the regions of the workpieces located outside the process zone may be carried out using a processing objective, by means of which laser radiation is focused for applying laser energy to the process zone for welding the glass workpieces, wherein, then, the radiation originating from the workpiece can be decoupled via a corresponding optical arrangement, for example, using a beam splitter.

The detection of the radiation originating from the workpiece can also be achieved using an objective separate from the processing objective, which is therefore not present in a position lying on the axis formed by the processing beam. Hence, a larger region capturing of the radiation originating from the workpiece as well as the environment of the process zone can be achieved, which is not necessarily possible by capturing the emitted radiation through the processing objective.

Thus, an imaging and/or focusing of/to such regions and planes of at least one of the workpieces that are not defined by the process zone is possible. In particular, it is possible to focus on planes within at least one workpiece that are not defined by the plane of the process zone. Moreover, regions of at least one workpiece that are provided at a distance from the process zone may also be observed.

The observation of regions and planes that are located at a distance from the process zone is not possible in common methods for monitoring the process zone while welding opaque materials, since the radiation emitted by the process zone cannot penetrate materials that are opaque to the radiation.

Accordingly, a larger region observation of the workpiece or the workpieces as well as the material volumes can be achieved, wherein the process zone is provided as a radiation source within the workpiece volume and accordingly the occurrence, and/or presence, and/or change of cracks, and/or imperfections, and/or defects within the workpiece can be detected during the welding process.

In certain embodiments, laser energy is applied to the glass workpieces for welding by a laser beam, such as an ultra-short-pulse laser, wherein by the use of short laser pulses nonlinear absorption effects can be achieved in the glass due to the achievable high intensities at the respective beam focus. If correspondingly high repetition rates are used for the ultra-short-pulse lasers, the energy introduced into the process zone by means of the respective pulses of the ultra-short-pulse laser accumulates, such that, due to corresponding heat accumulation effects, local melting of glass material occurs. Accordingly, a highly absorbing plasma the size of the focus volume emerges close to the geometric focus of the laser beam, which plasma then forms the process zone.

On the plasma surface, which bounds the process zone, and particularly in the region of the plasma surface that is oriented in the direction of the processing beam hitting the plasma and which the processing beam hits, absorption is increased. Thus, the plasma volume is able to further absorb energy on the plasma surface due to the increased absorption of the laser energy and the resulting energy input into the plasma volume, such that the plasma volume can continue to grow, wherein this growth of the plasma volume extends mainly directed along the processing beam and in the direction toward the beam source. In other words, the plasma can spread in an elongated shape along the processing beam. An elongated bubble, formed by the plasma, can be formed thereof.

Due to the additional energy input from the direction of the processing beam hitting the plasma, it is furthermore possible for the location and/or position of the plasma volume to change and to be displaced for example along the processing beam in a direction toward the beam source.

This way, an absorption volume can form, which may exceed the original focus volume many times over, such that the process zone can accordingly be many times larger than the focus volume.

If, due to the plasma surface escaping the focus of the laser beam because of the growth, the beam intensity hitting the plasma surface is no longer sufficient for maintaining the plasma, not enough energy can be absorbed to maintain the plasma, the expansion process of the plasma collapses and the absorption restarts in the focus of the laser beam. Accordingly, the welding process takes place virtually periodically and each time, plasma regions form, which in turn may result in a bubble-like melt volume. Due to the possible change of location and/or position of the plasma volume in the workpieces, a resulting melt volume may be larger than the created plasma volume. The plasma volume can pass, in a limited manner, through the workpiece volume and in so doing, can in each case leave a melted region, which, in turn, results in a melt volume, which has a larger expansion than the expansion of the plasma volume.

The non-linear absorption of the processing beam at the plasma can originate from the high electron temperature in the plasma. The electrons can give off energy to the atomic cores, which may lead to lattice vibrations and additional heating of the material due to heat accumulation.

Applying a relative movement of the processing beam with respect to the workpiece during the welding process, accordingly leads to a weld seam extending in the direction of movement after the previously melted material has solidified, which weld seam is present in the form of a series of bubble-like melt volumes merging into one another. The individual melt volumes may correspond to the respective plasma volume, however, are usually formed by the above-described migration of the plasma volume through the workpiece along the processing beam. In other words, the melt volume is usually larger than the largest dimension of the plasma volume.

The periodic expansion and collapse of the plasma also results in a periodic change of the intensity and the spectrum of the process zone serving as the radiation source. The radiation source may thus be subject to intensity fluctuations of the emitted radiation corresponding to the periodic bubble formation of the plasma, an associated change in the spectrum, a change in the expansion of the radiation source, and a change in the position of the radiation source. These periodic fluctuations of the intensity, the wavelength, the expansion, and/or the location of the radiation source, which serves for irradiation of the glass volume of the one, the two, or multiple or all glass workpieces, may be taken into consideration in the evaluation of the radiation originating from the workpieces and detected in a spatially resolved manner.

In certain embodiments, a localization of cracks and/or imperfections and/or defects in the workpiece and/or in the workpieces relative to the processing position predefined in each case, which is known due to the relative position between the laser beam and the workpiece, can be achieved.

Further advantages and features of the present disclosure can be seen in the following description of certain embodiments. The features described therein may be implemented on their own or in combination with one or multiple of the features presented above, provided the features do not contradict each other. In this regard, the following description of preferred exemplary embodiments is given with reference to the accompanying drawing.

DESCRIPTION OF DRAWINGS

Further embodiments of the disclosure are elucidated in more detail by means of the description below.

DETAILED DESCRIPTION

In the following, exemplary embodiments are described by means of the figures. Here, elements being equal or similar or having the same effect are provided with identical reference numbers in the different figures, and a repeated description of these elements is partly foregone to avoid redundancies.

Figure 1:
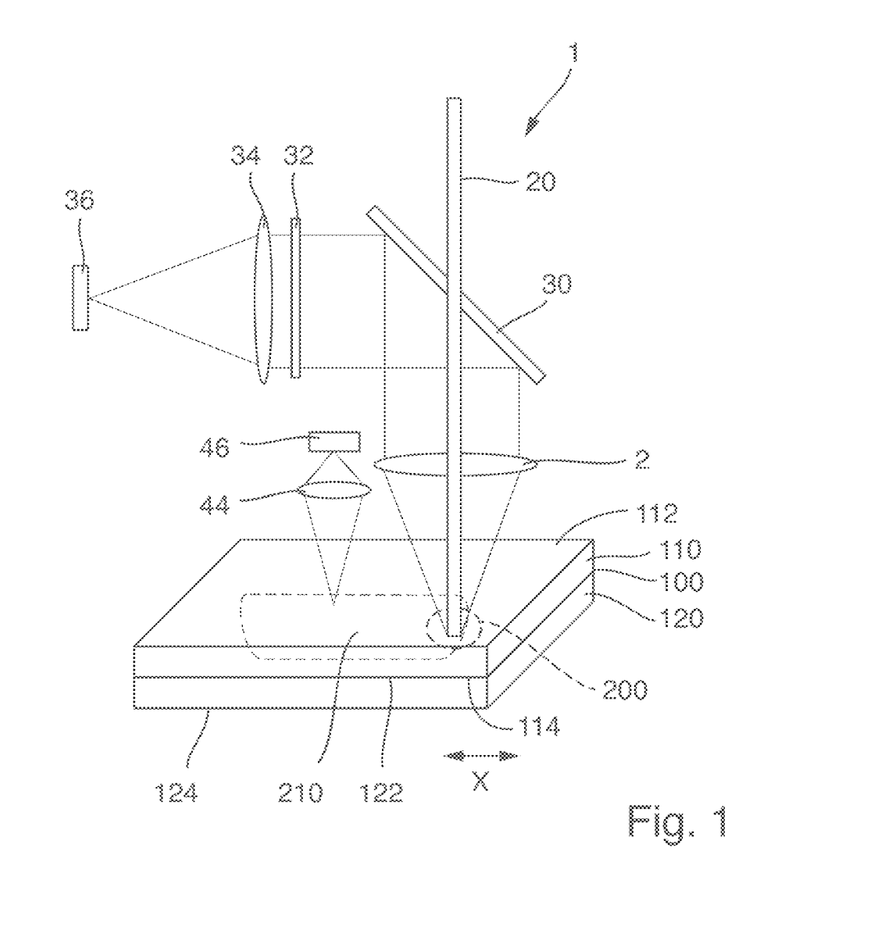
FIG. 1 is a schematic representation of a device for monitoring a laser welding process for welding glass workpieces as described herein.

FIG. 1 schematically shows a device 1 for monitoring a welding process for welding two workpieces 110, 120.

In the embodiment shown, the workpieces 110, 120 are formed of glass—for example in the form of two glass panes—which are arranged next to each other at a common border surface 100, which is arranged between the two workpieces 110, 120, and are welded together at a section of the border surface 100. In other words, at least part of the bottom side 114 of the upper workpiece 110 shown in FIG. 1 abuts on the upper side 122 of the lower workpiece 120. Accordingly, the upper side 122 of the lower workpiece 120 and the bottom side 114 of the upper workpiece 110 together form the border surface 100, in which the welding is to be performed and/or has been performed.

The two workpieces 110 and 120 can be joined by means of optical contact bonding in the region where the border surface 100 is formed, to achieve a provisional positioning and fixation of the two workpieces 110 and 120 against one another even before welding.

Due to the nature of their material, namely glass, the two workpieces 110, 120 are substantially transparent to the laser radiation, by means of which the two workpieces 110, 120 are to be welded. Thus, the laser radiation, which is provided for carrying out the welding, can pass through the workpieces 110 and 120 and in particular, can also reach the border surface 100 through the upper workpiece 110. This makes welding the workpieces 110 and 120 within the workpiece volume formed by the two workpieces 110, 120 possible.

Such welding within a workpiece volume formed by at least two workpieces is not possible using materials that are opaque to the laser radiation.

However, the workpieces 110, 120 may also be designed such that merely the upper workpiece 110 is transparent for the processing beam and the lower workpiece 120 is, in contrast, opaque. Accordingly, a welding of a glass material with a metal material lying underneath in the direction of the processing beam could also be considered, for example.

The device 1 comprises a processing objective 2, through which a processing beam 20 hits the workpieces 110, 120 and is focused in a process zone 200, whereby the intensity of the processing beam 20 is highest in the focus located in the process zone 200, whereas it is lower in the surrounding regions. The processing of material in the process zone 200 occurs because the high intensity of the processing beam 20 in its focus results in melting the material present in the process zone 200. Hence, it is possible to achieve, for example, the welding of two material regions, which were previously present separately in the process zone 200 and are now connected in a materially bonded manner by means of melting, during subsequent cooling.

The processing beam 20 can be provided in the form of a laser beam, such as in the form of an ultra-short-pulse laser beam. Particularly when using an ultra-short-pulse laser beam, non-linear absorption effects are achieved in the glass material of the at least one workpiece 110, 120 due to the very high intensities in the focus provided by the processing objective 2. When using a suitable repetition rate of the laser pulses, heat accumulation effects occur in the glass material, which leads to a local melting of the glass material in the process zone 200.

For example, a pulsed laser having wavelengths of 1030 nm or 1064 nm or 515 nm or 532 nm with pulses in the femtosecond range or picosecond range and with frequencies of the repetition rates between 100 kHz and multiple MHz can be used. The laser can also be operated in burst mode.

To achieve a connection of the workpieces 110 and 120, the process zone 200 is accordingly placed such that it is arranged close to the border surface 100 or includes the border surface 100. For this purpose, the processing beam 20 is prepared accordingly and focused into the process zone 200 by means of the correspondingly configured and set up processing objective 2.

The embodiment of a processing objective 2 for a processing beam 20 for processing, and in particular welding, workpieces 110 and 120 in a process zone 200 is generally known. This also applies to the use of ultra-short-pulse lasers.

In the process zone 200, in which the focus of the processing beam 20 is located, the material of one, multiple or all workpieces 110, 120 is melted in order to then, after the previously melted material is solidified again, achieve a welding of the workpieces 110, 120 due to the melted and then solidified material. The process zone 200 may have the same expansion as the focus of the processing beam 20 or expand further.

The processing beam 20, together with the processing objective 2, is displaceable relative to the workpieces 110, 120 in a displacement direction X, in order to draw a weld seam 210 in the workpieces 110, 120. In this regard, either the workpieces 110, 120 or the processing beam 20 with the processing objective 2 or even both can be displaced along the displacement direction X. It is also possible to carry out movements in parallel to the plane formed by the border surface 100 for drawing correspondingly more complex shapes of weld seams 210.

In this regard, the process zone 200 is located between the two workpieces 110, 120 and encloses the border surface 100. The processing beam 20 can pass through the workpieces 110, 120 due to their transparency and subsequently makes it possible to process the process zone 200 located inside the glass volume defined by the workpieces 110, 120.

This arrangement of the process zone 200 inside the glass volume formed by the workpieces 110, 120 accordingly diametrically differs from the process zones, in which materials that are opaque to laser radiation are welded. In the case of an opaque material, for example, when welding two metallic workpieces together, it is impossible for a processing beam to pass through an upper side of a first workpiece, such that it makes it possible for the bottom side of said workpiece to be welded to a second workpiece opposite the bottom side. In fact, the processing beam can then not penetrate the opaque workpiece.

Thus, a particular embodiment and set up of the processing objective 2 is advantageous for accordingly making it possible to focus the processing beam 20 into the inside of the glass volume, which is formed by the at least two workpieces 110, 120.

The process of forming the weld seam 210, which is achieved by melting the material of the first workpiece 110 and/or of the second workpiece 120 and a subsequent solidification of the melted material, may be described by the formation of plasma regions, wherein first, a heating of the material occurs in the focus of the processing beam 20 and then a highly absorbing plasma forms by non-linear absorption, since the electrons also give off energy to the atomic cores and accordingly generate lattice vibrations with the resulting heat accumulation effects.

A high absorption of the laser intensity takes place at the respective plasma surface in such a way that, due to the strong absorption at the plasma surface, the plasma can expand further in the direction of the processing beam 20 in a correspondingly bubble-like manner and/or can move along the processing beam 20 in the direction toward the beam source. This process of expansion and/or change of location and/or change of position is terminated as soon as the surface of the plasma running out of the focus of the processing beam 20 due to the expansion is no longer supplied with enough intensity by the processing beam 20, which is then no longer focused in this region, to maintain the plasma, whereby it then collapses and the process of bubble formation starts again starting from the energy introduced into the focus of the processing beam 20. The bubble formation thus takes place periodically and, in each case, starting out from the focus of the processing beam 20. The shape of the bubbles according is elongated in the direction of the processing beam 20.

As already mentioned, melting of the material present there, for example of the glass material, takes place in the process zone 200. At that point in time, the process zone 200 emits electromagnetic radiation. This emission of electromagnetic radiation takes place at least while the process zone 200 is exposed to the processing beam 20—however, a kind of afterglow may also take place as long as the melted and solidifying material has an increased temperature.

In this regard, the electromagnetic radiation emitted by the process zone 200 is radiation of the processing beam 20 reflected or scattered on or in the process zone 200. The electromagnetic radiation emitted by the process zone 200 can also be heat radiation of the melted glass material.

Accordingly, electromagnetic radiation is emitted from the process zone 200, such that the process zone 200 can also be regarded virtually as a radiation source for the internal illumination of the workpieces 110, 120.

Since the process zone 200 is preferably arranged within the volume formed by the workpieces 110, 120, the process zone 200 can therefore also be regarded as a radiation source arranged within the workpieces 110, 120, which virtually illuminates the workpieces 110, 120 from within.

The radiation emitted by the process zone 200 and originating from the at least one workpiece may for example be captured using the processing objective 2 and then imaged onto an image sensor 36, for example, via a beam splitter 30, an optical filter element 32 and a focusing lens 34, such that the image sensor 36 is correspondingly acted upon by a spatially resolved image of the workpiece or the workpieces and outputs a corresponding signal.

The beam splitter 30 can be designed as a dichroic mirror, for example.

The optical filter element 32 can be selected, for example, for weakening the radiation decoupled by the beam splitter 30 and/or for selecting a certain wavelength range and/or for suppressing reflected processing light.

The image sensor 36 can be provided, for example, in the form of a matrix camera. For example, such a matrix camera can have a spectral sensitivity that is suitable, i.e., high enough, for the temperature radiation to be measured. Alternatively, multiple individual cameras, e.g., matrix cameras, can be provided as a detector system, with a single, selective spectral range being imaged onto each individual camera. The one, or at least one, matrix camera can be made of different semiconductor materials.

A camera for radiation ranging from the visual spectral range to near-infrared to far-infrared can also be used as the image sensor 36. For example, CCD, CMOS, and/or InGaAs cameras are suitable as a camera for the image sensor, wherein this list is by no means exhaustive and further suitable types of cameras can be used.

If individual cameras are used to form the image sensor 36, multiple different cameras can also be combined. For example, different cameras with different spectral sensitivities may be used for different spectral ranges to be measured.

By means of the image sensor 36, a spatially resolved image of the radiation emitted by the process zone 200 and originating from one or both of the workpiece 110, 120 can correspondingly be achieved.

Accordingly, spatially resolved capturing of the radiation emitted from the process zone 200 and originating from the surrounding regions can be achieved by means of the image sensor 36.

As the process zone 200 virtually serves as a radiation source during the processing operation, said radiation source being arranged within the glass volume formed by the workpieces 110, 120, it is accordingly possible to capture, by means of the image sensor 36, an image of the environment irradiated by the process zone 200 serving as a radiation source and in particular of the glass volume irradiated by the process zone 200. Hence, it is possible to detect forming cracks, imperfections, or defects in the glass volume formed by the workpieces 110, 120 via the scattering and/or reflection of the radiation from the process zone 200 occurring there.

Thus, the presence, and/or emergence, and/or change of cracks, and/or imperfections, and/or defects, which optically serve to scatter and/or reflect the radiation emitted by the process zone 200, can be detected using the image sensor 36.

In addition to, or as an alternative, to the image sensor 36, which captures the radiation captured via the processing objective 2 and coupled out via the beam splitter 30, an image sensor 46 can be provided, which enables imaging of the radiation emitted from the volume of the workpieces 110, 120 by means of an objective 44. By means of the additional or alternative image sensor 46, which can be designed like the image sensor 36 already described above, a detection of cracks, imperfections, or other defects in the volume formed by the workpieces 110, 120 can be detected at a position independent of the processing objective 2.

Thus, an image sensor 46 independent of the processing objective 2 can be used to view not only the immediate vicinity of the process zone 200, but also any other positions of the workpieces 110, 120 for an image of the radiation emitted at cracks, defects and imperfections. Hence, quality control of the workpieces 110, 120 can be performed across a wider region or over the entire extent. In other words, the quality control is then not limited to the immediate vicinity of the weld seam 210, but may also include regions arranged at a distance therefrom.

Figure 2:
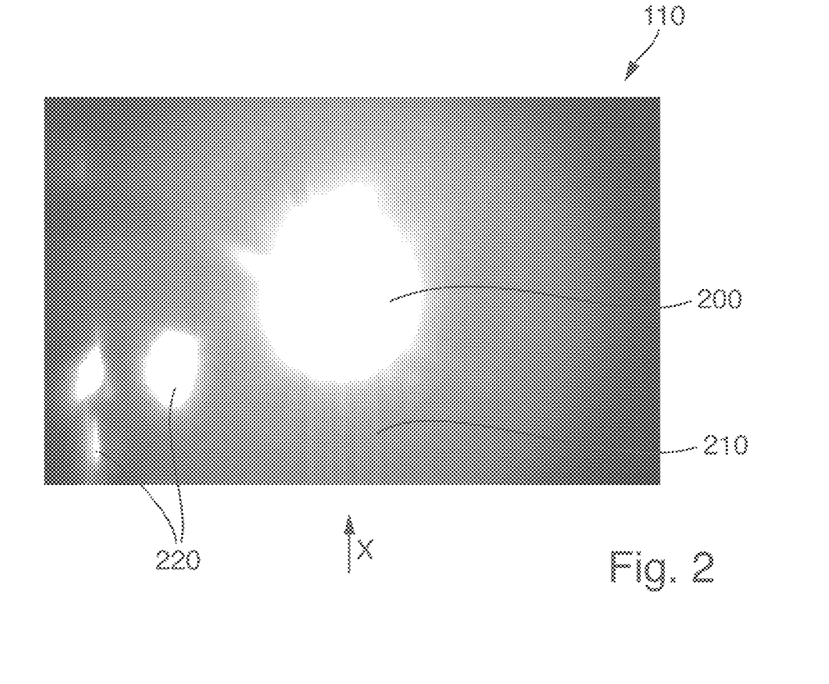
FIG. 2 is a representation of a camera image, captured by a camera, of the process zone and its surroundings during performance of a laser welding process while welding glass workpieces.

FIG. 2 shows a camera image of the region surrounding the weld seam 210. In this regard, a corresponding glow can initially be seen within the process zone 200, indicating an emission of radiation from the process zone 200. The process zone 200 moves in the direction x relative to the workpiece 110 shown. Accordingly, the already formed weld seam 210 can also be seen in the camera image.

The radiation emitted from the process zone 200 serving as a radiation source is scattered or reflected at cracks 220, and/or defects, and/or imperfections already present or formed during the treatment in such a way that these are visible in the camera image.

FIG. 2 accordingly shows both the process zone 200 with the weld seam 210 that emerged from the welding process and the presence or the formation of cracks 220, or other defects, or imperfections in the workpiece 110. In this regard, the cracks 220, defects, or imperfections do not necessarily have to emerge or have emerged due to the processing operation and in particular, the heat in the process zone 200, but these cracks 220, defects, or imperfections may also have been present already before the beginning of the processing operation. By the described capturing of the camera image, it may also be monitored whether the cracks, defects, or imperfections change—for example become larger or smaller—due to the processing.

The precise knowledge of the relative position of the process zone 200 within the workpiece 110 due to the relative positioning between workpiece and processing objective 2 allows a precise localization of these cracks and/or imperfections and/or cracks with respect to the workpiece 110 due to the spatially resolved camera image.

Furthermore, in case of an additional time-resolved capturing of the camera image, a change in the cracks 220, defects, or imperfections may also be monitored over time.

This observation of the formation, and/or change of cracks 220, imperfections, and/or defects in the workpiece 110 can also be performed in real time. This allows for an optimization of the parameters of the actual processing operation in an efficient manner, as the response of the material of the workpiece 110 to a change in a process parameter can be seen immediately.

Due to the possibility to localize cracks, and/or imperfections, and/or defects, a tracking or regulation of process parameters can be carried out. For example, the power of the processing beam 20 or the feed rate can be adapted. If, for example, an excessive occurrence of cracks in one, multiple, or all workpieces 110, 120 is detected, the power of the processing beam 20 can be reduced or the feed rate can be increased accordingly, in order to reduce the formation of cracks due to tensions created by the introduced temperature gradient.

Figure 3:
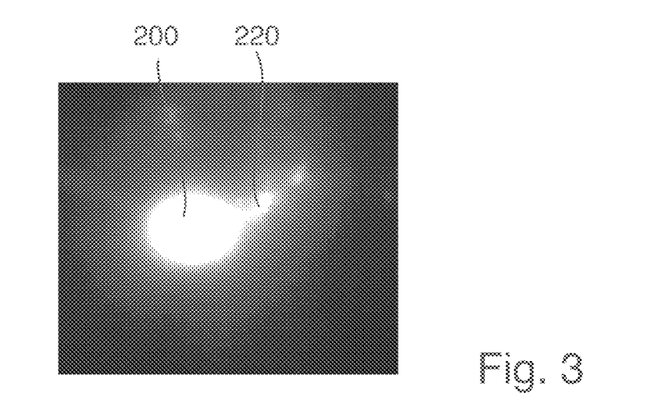
FIG. 3 is a further representation of a camera image, captured by a camera, of the process zone and its surroundings during performance of a laser welding process while welding glass workpieces.

FIG. 3 shows a further example of a camera image, in which both the process zone 200 with the corresponding emission of the radiation and the origination of radiation starting out from a crack 220, which directly adjoins the process zone 200, can be seen. An evaluation of the images captured by means of the image sensors 36 and/or 46 can be carried out, for example, by first preparing the captured signals. For example, a filtering of the signals can be carried out and/or a noise reduction can be carried out and/or a smoothing of the signals can be carried out and/or special features of the signals can be highlighted and/or a contrast enhancement and/or an edge filtering may be carried out etc.

The signal captured by means of the image sensors 36 and/or 46 can be processed by means of an image processing, wherein, for example, a synchronization of the determined signals and/or of the images represented by the signals is compared with a target distribution of intensity values outside the process zone and a determination of cracks and/or imperfections and/or defects may be achieved by an evaluation of the regions outside the process zone deviating from the target distribution in terms of the brightness and/or the contrast and/or the shape and/or the size of the deviating regions.

A further or alternative evaluation of the prepared signal also can be achieved by a spatial integration for example across the intensity values of the individual image pixels and a subsequent comparison with a previously determined tolerance range. Hence, a location information in the coordinate system of the workpieces may be determined in terms of the presence, and/or the formation, and/or the change of cracks, and/or imperfections, and/or defects.

In this regard, an uncertainty with respect to the determination of the location may result from deviations of the conformity of the field of observation of the sensor 36, 46 used with the respective section of the workpieces 110, 120, wherein this uncertainty can be reduced by an initial calibration of the sensor system to the respectively viewed focal plane and/or by the application of position and/or distance markings that are detectable by means of the respective sensor 36, 46.

It is particularly useful for an automated error output to take place upon exceedance of predefined tolerance limits to accordingly terminate a welding process if there is a high probability of producing waste material by means of the processing operation.

Moreover, countermeasures for stabilizing the processing operation can be provided to accordingly adapt the process parameters automatically, such that the occurrence or change of cracks, defects, or imperfections is reduced.

If applicable, all individual features, which are represented in the embodiments described herein, can be combined with, and/or exchanged for, one another, without extending beyond the scope of the disclosure.

LIST OF REFERENCE NUMBERS

1 Device for monitoring a welding process
100 Border surface
110 (Upper) workpiece
112 Upper surface of the upper workpiece
114 Lower surface of the upper workpiece
120 (Lower) workpiece
122 Upper surface of the lower workpiece
124 Lower surface of the lower workpiece
2 Processing objective
20 Processing beam
200 Process zone
210 Weld seam
220 Crack and/or reflection/scattering on crack
30 Beam splitter
32 Optical filter
34 Focusing lens
36 Image sensor
44 Optic
46 Image sensor
X Displacement direction

What is claimed is:

1. A method for monitoring a welding process for welding at least one glass workpiece to a further workpiece, the method comprising
welding the workpieces together in a process zone that is exposed to a processing beam guided to the process zone through the at least one glass workpiece, which is transparent to the processing beam; and
detecting radiation emitted by the process zone and originating from at least one of the workpieces in a spatially resolved manner, wherein the emitted radiation comprises laser processing beam energy reflected or scattered from any one or more of cracks, imperfections, or defects within the at least one glass workpiece.

2. The method of claim 1, wherein the processing beam comprises a laser beam.

3. The method of claim 1, wherein the radiation originating from the workpiece is detected and captured by an image sensor, and further comprising converting the captured radiation into a signal with the image sensor, and preparing the signal for a subsequent evaluation.

4. The method of claim 2, wherein the laser beam comprises an ultrashort pulse laser beam.

5. The method of claim 1, wherein the radiation originating from the workpiece is detected in a spatially resolved manner outside the process zone.

6. The method of claim 1, wherein the radiation originating from the workpiece is further detected in a time-resolved manner.

7. The method of claim 3, wherein the signal is evaluated in terms of one or more of a presence, formation, or a change of one or more of cracks, imperfections, or defects.

8. The method of claim 3, wherein two glass workpieces are welded together.

9. The method of claim 7, further comprising providing an error output when predefined tolerance limits of the one or more cracks, imperfections, or defects are exceeded.

10. The method of claim 3, wherein the signal is prepared by one or more of a filtering, noise reduction, smoothing, highlighting of special features, contrast enhancement, or an edge filter.

11. The method of claim 3, wherein the signal is evaluated by a spatial integration across the intensity values of the image pixels and a subsequent synchronization and a following comparison with a previously determined target value and/or by a synchronization of the intensity values with a previously determined target distribution of the intensity values, so as to detect one or more of the presence, formation, emergence, or the change of one or more of cracks, imperfections, or defects.

12. The method of claim 3, further comprising identifying one or more of cracks, imperfections, or defects based on the radiation detected in a spatially resolved manner and originating from at least one of the workpieces; and outputting one or more of the identified cracks, imperfections, or defects in a spatially resolved manner.

13. The method of claim 3, further comprising localizing one or more of cracks, imperfections, or defects relative to the process zone; and outputting the localization of the one or more of the cracks, imperfections, or defects.

* * * * *